United States Patent [19]

Goldberg

[11] 4,383,261
[45] May 10, 1983

[54] METHOD FOR LASER RECORDING UTILIZING DYNAMIC PREHEATING

[75] Inventor: Mark W. Goldberg, Laurel, Md.

[73] Assignee: The United States of America as represented by the Director of the National Security Agency, Ft. George G. Meade, Md.

[21] Appl. No.: 180,075

[22] Filed: Aug. 21, 1980

[51] Int. Cl.³ ............................................. G01D 15/14
[52] U.S. Cl. .................................... 346/1.1; 346/76 L
[58] Field of Search ....................... 346/76 L, 108, 1.1; 365/124; 358/129, 128.5, 342, 344; 369/109, 111, 121

[56] References Cited

U.S. PATENT DOCUMENTS

| | | | |
|---|---|---|---|
| 3,902,010 | 8/1975 | Goshima | 346/108 X |
| 4,053,898 | 10/1977 | Hirayama et al. | 346/108 X |
| 4,110,607 | 8/1978 | Honjo et al. | 369/111 X |
| 4,125,842 | 11/1978 | Ohnishi et al. | 346/1.1 |
| 4,253,102 | 2/1981 | Kataoka et al. | 346/76 L |

OTHER PUBLICATIONS

Proceedings of the Society of Photo-Optical Instrumentation Engineers, vol. 200, pp. 84–88 "Preheat-Aided Laser Recording", M. Goldberg, 1979, 346-76L.

Primary Examiner—G. Z. Rubinson
Assistant Examiner—W. J. Brady
Attorney, Agent, or Firm—John R. Utermohle; Thomas O. Maser

[57] ABSTRACT

An improved method and apparatus for laser recording of information onto a metal film by dynamically heating the film immediately prior to recording. A single track of information is recorded by directing two laser beams onto the film. An unmodulated preheat beam supplies energy to raise the temperature of the metal film to just below that required for recording. A modulated write beam then provides sufficient additional energy to selectively raise the temperature of the film to a necessary level for recording of data.

4 Claims, 6 Drawing Figures

METHOD FOR LASER RECORDING UTILIZING DYNAMIC PREHEATING

BACKGROUND OF THE INVENTION

1. Field of the Invention

This invention relates to the field of data recording, and more specifically to optical recording of data onto a thin thermally sensitive film by means of a modulated laser beam.

2. Description of the Prior Art

It is known that by focusing a laser beam of sufficient intensity onto a thin absorbing film, an area approximately the size of the focused spot can be heated sufficiently to allow a hole to be formed in the film. The beam may be modulated into light pulses representing information to be recorded, which pulses are focused onto a moving medium, commonly a rotating disc. A track of holes is placed in the recording layer, forming a spatial representation of the time modulation. The holes are a result of each pulse carrying sufficient energy to the recording layer to raise the illuminated area above the hole formation temperature. Optical disc recording in this manner has demonstrated a capability to store approximately $10^{11}$ bits of information on a single side of a 12 inch diameter recording disc with a single channel input rate of up to 50 M bit/second. The high performance laser recorders that have been demonstrated are characterized by high peak write power requirements that necessitate gas rather than semiconductor lasers and costly external modulators. This is especially true for multichannel hardware designed to attain data rates in excess of the single channel data rate. In this case the write power requirements necessitate the use of a large water-cooled gas laser. The modulator required is a complex multichannel design involving costly fabrication procedures.

It would be highly desirable to replace the water-cooled gas laser and complex modulator required in a multi-channel recording system with a semiconductor laser array. Semiconductor lasers are small and efficient and would not require water-cooling. They can be directly modulated by modulating their drive current, thus eliminating the need for a separate complex modulator. However, present semiconductor lasers do not produce sufficient power to be capable of high data rate writing while retaining the beam control required for producing the smallest focused spot possible. In addition, operating a semiconductor laser at the power levels necessary for high data rate writing raises the operating temperature of the laser to a point which prohibatively shortens its operating life. This problem would be compounded in a multiple laser array suitable for use as a multichannel writing source. In such an array the power output of the lasers would be limited by the amount of heat that could be dissipated by the small array. A further disadvantage of semiconductor lasers in the prior art apparatus and method is that the recording spot diameter, which determines data packing density, is greater when produced by a semiconductor laser than when produced by the gas lasers typically used as a write source. The longer wavelength associated with semiconductor lasers enlarges the spot diameter to a size which seriously reduces the amount of data which can be stored on an optical disc.

SUMMARY OF THE INVENTION

It is an object of this invention to provide a practical method and apparatus for increased performance laser recording of data onto thermally sensitive films using semiconductor lasers.

It is a further object to provide a means of laser recording of data utilizing less energy from the write source than is currently required.

A still further object is to provide a laser recording system having improved resolution and therefore increased data packing density.

A further object is to provide a laser recording apparatus allowing data recording at increased rates.

Another object is to provide a multichannel semiconductor laser recorder incorporating the previous advantages.

An optical recording apparatus having these and other desirable features would include means for providing an unmodulated preheat beam, means for providing a modulated write beam, a recording medium, and means for focusing said preheat beam and said write beam onto said medium.

A method of optical recording having these and other desirable advantages would include the steps of focusing an unmodulated preheat beam onto a spot on a recording medium to heat the spot to a temperature below the hole formation threshold of the medium, and cofocusing a modulated write beam superimposed onto the preheat beam to selectively vary the spot temperature above and below the hole formation threshold of the medium.

BRIEF DESCRIPTION OF THE DRAWINGS

The invention may be best understood by reading the description in connection with the drawings, in which.

DESCRIPTION OF THE PREFERRED EMBODIMENT

Figure 1:
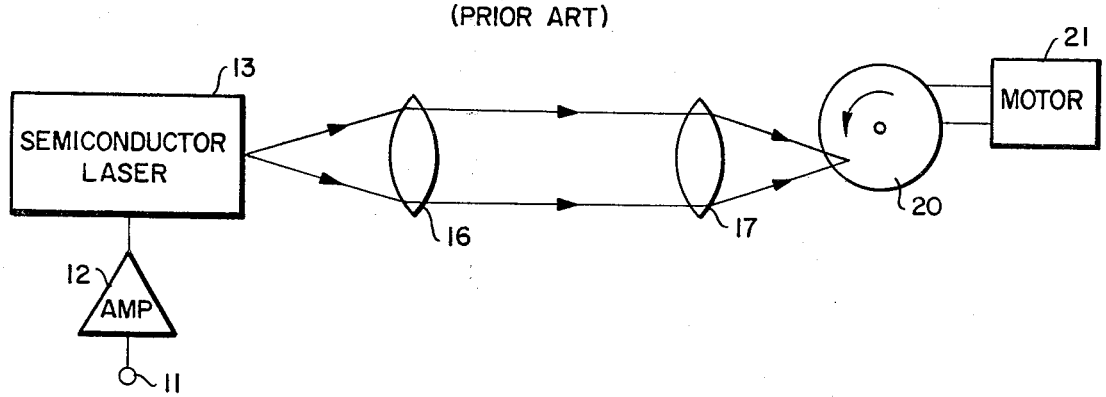
FIG. 1 is a block diagram of a semiconductor laser optical recorder typical of the prior art.

A semiconductor laser recorder geometry typical of the prior art is illustrated in FIG. 1. The information to be recorded is provided through an input 11 to an amplifier 12 which then drives a semiconductor laser 13. The output of laser 13, which is now modulated by the incoming information, is collected by lens 16 and focused by lens 17 onto a recording medium 20, such as an optical recording disc. The medium might be a metal coating on a plastic substrate; for example, aluminum or rhodium on mylar as is described in U.S. Pat. No. 3,474,457, or telluium on plastic. A motor 21 turns medium 20 to continuously move the surface past the modulated beam such that information may be sequentially recorded into the medium. The medium is also moved laterally on its axis relative to the focused spot by means which are not shown to facilitate recording onto its entire surface, as taught by the prior art. It is obvious that all the optical energy required for writing must come from the semiconductor laser 13. This places severe demands on the laser if high data rates are to be achieved.

My invention overcomes the disadvantages of the prior art by dividing the hole formation process into two steps. In the first, or preheat step, the temperature of the recording medium is raised to some threshold typically near the melting point above which hole formation begins. In the second, or write step, the actual writing takes place when sufficient additional energy is provided to generate the thermal condition necessary to actually form a hole of the required size. The two steps are performed by two separate optical beams that are superimposed and cofocused at the point on the medium at which writing is to occur. The preheat beam supplies the energy required to perform the preheat step, while the write beam supplies the additional energy required to perform the write step.

The preheat function is not information dependent since no hole is formed; therefore, the preheat beam can be continuous. When the incident spot is continuous, each point on the moving recording layer is subjected to the heating effect of the spot for the maximum length of time. Therefore, a continuous preheat beam allows the desired threshold temperature to be reached with the lowest incident power. The use of a continuous beam avoids the inefficiencies associated with the process of modulation i.e., the thruput loss of an acousto-optic or electro-optic modulator with their associated optics. Consequently, the preheat step can be performed efficiently by a low power unmodulated gas laser. The same laser could also provide the additional beams required in any optical recording system for information read-out and for position sensing necessary for servo control. These functions are not explicitly included in the explanation of the preheat aided recording systems since it is only the record function which is affected by this invention. These functions could, however, be included by the incorporation of appropriate elements into the preheat beam path.

The write beam must be modulated to allow it to control the hole formation process. Consequently, the path that the write beam takes will be similar to the path described in FIG. 1.

Figure 2:
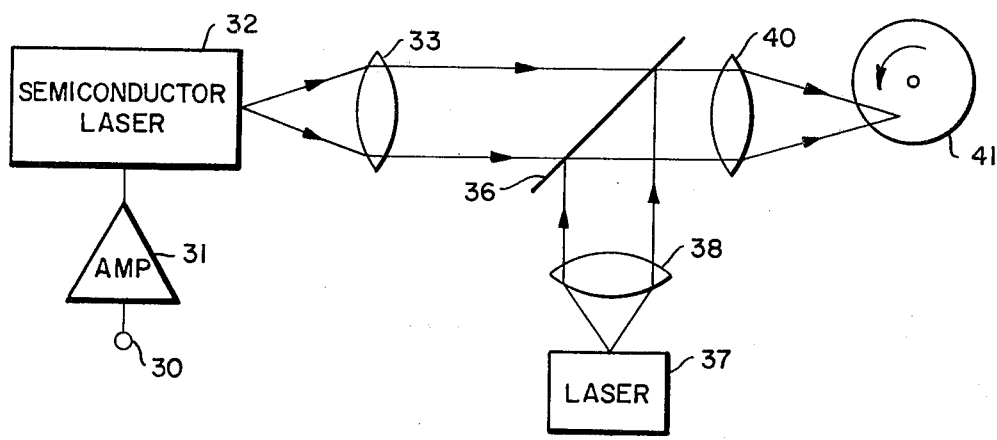
FIG. 2 illustrates a preferred embodiment of my invention.

An improved semiconductor laser recording apparatus according to my invention is illustrated in FIG. 2. As in the prior art, information to be recorded is provided to an input 30 to modulate the output of semiconductor laser 32 thru the action of amplifier 31. The modulated output is collected by lens 33 and directed through a dichroic beam splitter used as a combiner 36. The unmodulated output of a preheat laser 37, after collection by a lens 38, is reflected off the beam combiner 36 and follows the same path as the write beam. The beam combiner 36 is wave length selective so that it transmits the output of semiconductor laser 32 and reflects the output of preheat laser 37. Both the preheat beam and write beam pass thru a focusing lens 40 and are focused and superimposed onto a recording medium 41. The intensity of laser 37 is adjusted such that the sum of the beam from lasers 32 and 37 is sufficient for hole formation in the recording medium 41, subject to the control of the modulation of laser 32. It is clear that the output of laser 32 may be reduced from that required of laser 13 in FIG. 1 because of the contribution that the preheat beam from laser 37 makes toward hole formation.

The magnitude of the write beam energy reduction made possible by the use of preheat depends upon how the total energy requirement is divided between the two steps in hole formation. A preheat fraction is defined to measure this division. For a given spot size, media velocity and write pulse length, the preheat fraction is defined as $$f = E_p/E_t$$

where $E_p$ equals the energy that would be required from the write beam if it were to perform only the preheat step and $E_t$ equals the total energy that would be required from a write beam if it were to perform both the preheat and write steps. If the preheat beam power is increased in an effort to reduce the energy required from the write beam by more than $E_p$, than a continuous channel will be written by the preheat beam. Therefore, f is the largest fractional reduction in write beam power made possible by the use of preheat. Both by calculation and by experimental results, f was determined to be on the order of 0.5, in a particular case utilizing a recording medium of tellurium on a plastic substrate moving at a velocity of $10^7$ spot diameters per second. This indicates the feasibility of a 50% reduction in the peak power of the write beam.

Figure 3:
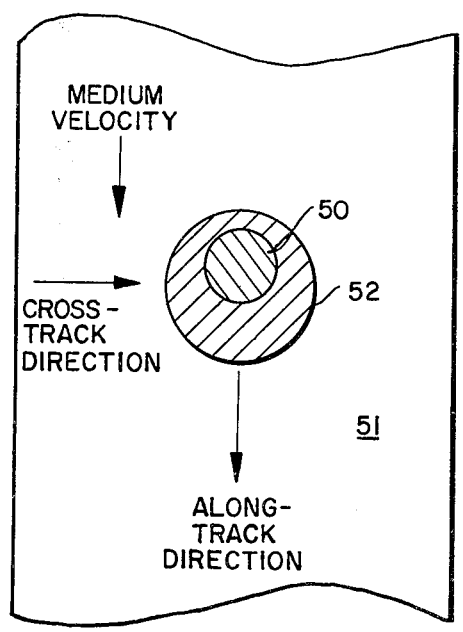
FIG. 3 illustrates a superposition of two light beams on the recording medium in accordance with my invention.
Figure 4A:
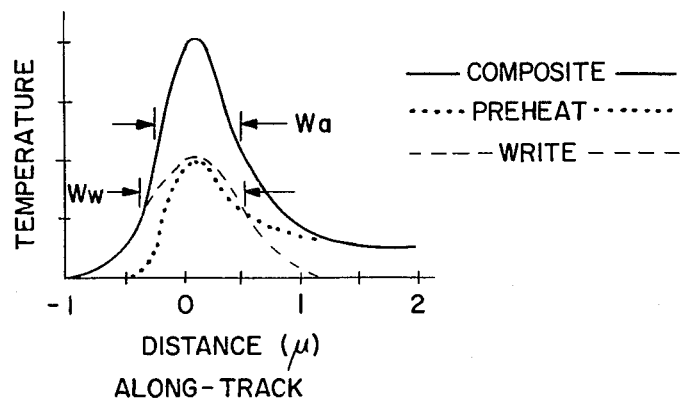
FIGS. 4a and 4b represent typical temperature distribution curves illustrating the effects of my invention.
Figure 4B:
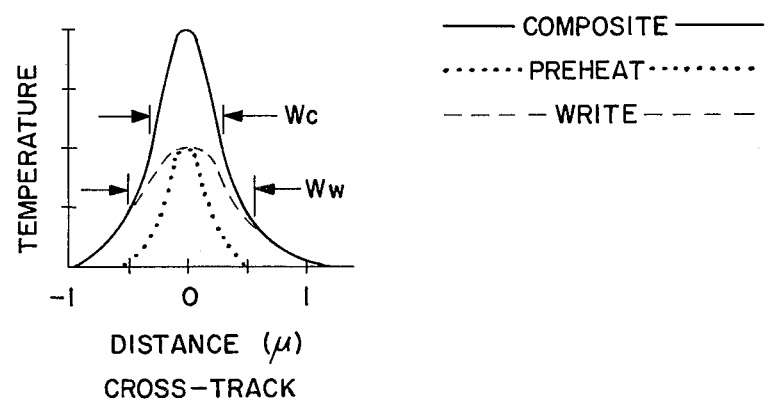

An improvement in recorded packing density is possible if the preheat spot is made smaller than the write spot. This can be accomplished by providing a preheat laser with an output wavelength shorter than that of the write laser, as would be the case if a gas laser were used for preheat and a semiconductor laser were used for write. This is illustrated in FIG. 3 where a preheat spot 50 focused on the surface of a recording medium 51 is one half the diameter of a write spot 52. The along-track and cross-track directions are indicated, as is the velocity of the recording medium relative to the recording spots. The recording density improvement is related to the reduction in size of the temperature distribution generated by the combined action of the write and preheat spot compared to the size of the distribution that would result if the write spot were used alone. FIGS. 4a and 4b illustrate this effect in both the along-track (FIG. 4a) and cross-track (FIG. 4b) directions for an analytic model in which the preheat spot is one half the diameter of the write spot. The temperature distributions that result when the preheat or write beam act independently are shown, along with the composite distribution that is a result of their simultaneous action. The preheat fraction for this model is 0.5 and the write spot diameter is 1μ (typical of a focused spot produced with a semiconductor laser). From FIGS. 4a and 4b it is apparent that in both the along-track and cross-track directions the composite temperature distributions have a smaller full-width at half-power $W_a$ and $W_c$ respectively, than that of the write spot distribution, $W_w$. The hole size produced during the write process is proportional to the halfpower width of the temperature distribution; therefore, the use of preheat will allow a smaller feature to be produced in both the along-track and cross-track directions then if the write spot acted alone at higher power. The example illustrated in FIGS. 4a and 4b indicate a 50% reduction in track spacing and a 10% increase in the along-track spot density, which is equivalent to a data rate increase. Experimental results have confirmed these packing density and data rate improvements and have indicated that under different conditions even greater improvements are possible.

Figure 5:
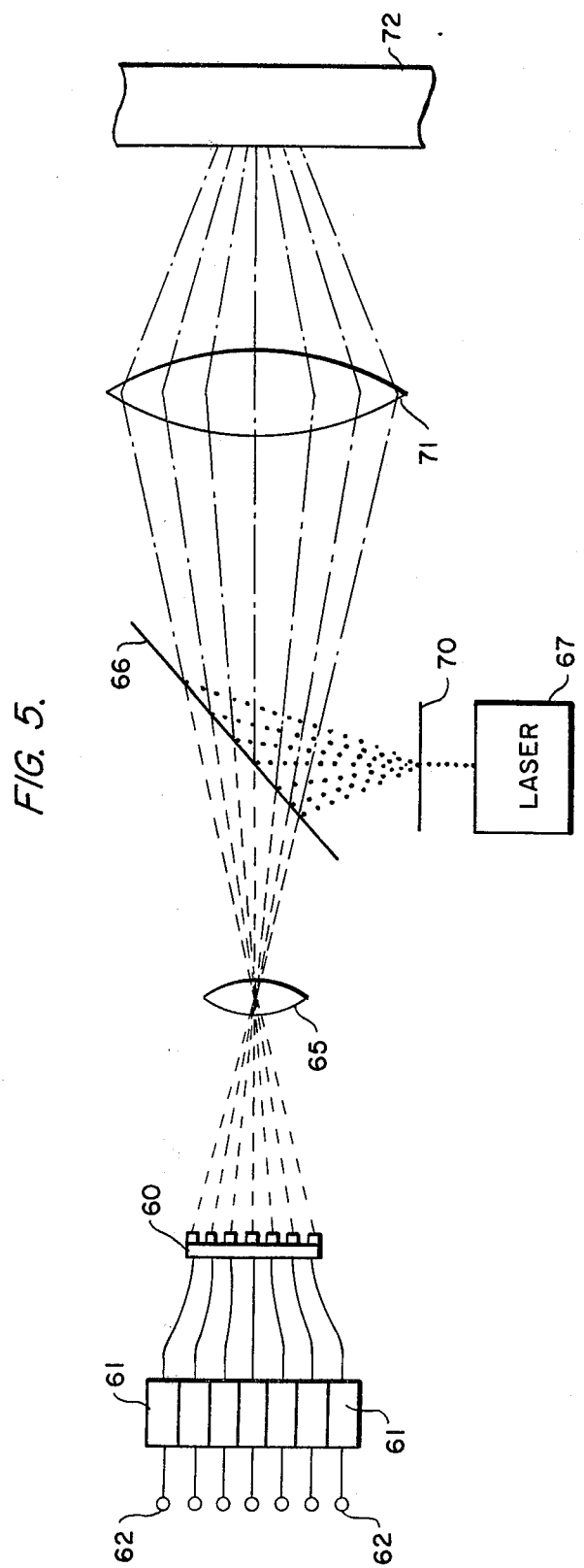
FIG. 5 illustrates a multichannel semiconductor laser recording system utilizing the concepts of this invention.

Currently existing semiconductor lasers are limited by output wavelength capabilities to production of spot diameters which are greater than those diameters achieved by commonly used gas lasers. Thus, all the advantages of my invention are easily achieved in a multichannel system when a low power gas laser is used to supply the smaller diameter preheat beams and a semiconductor laser array supplies the modulated write beams. A multichannel embodiment of my invention is illustrated in FIG. 5. An array 60 of semiconductor lasers is driven by an array 61 of amplifiers, such that each laser is individually modulated by the output of one amplifier. Input data is fed to the amplifier array 61 via a plurality of terminals 62—62. The laser array so modulated acts as the source of multiple write beams, one beam for each channel to be recorded. The light output from array 60, indicated by dashed lines, is collected by a lens 65 and is directed through a beam combiner 66. A laser 67 produces a continuous output having a shorter wavelength than that of the outputs from the semiconductor laser array 60. The beam from laser 67 is directed through a multiple beam generator 70, for example, a diffraction grating designed to provide one continuous beam for each write beam. The diffraction grating could be a fixed grating produced in a photographic medium or it could be produced actively in an acousto-optic device. The beams from generator 70, indicated by dotted lines, are directed to the beam combiner 66 and combined with the write beams. The combining process superimposes each write beam with one of the preheat beams to produce a combined array of beams, indicated by dotted/dashed lines, which all fall within the entrance pupil of lens 71 and are focused onto recording medium 72. By the action of lens 71 each write/preheat beam combination forms a separate small focused spot on the recording medium for each recording channel. The recording process takes place in the manner described with respect to FIG. 2, except that there are multiple channels being recorded simultaneously. A number of benefits are derived by this arrangement over the multichannel recorder prior art, including:

a. Elimination of a requirement for a high-power water-cooled, gas laser;

b. Reduction of the semiconductor laser outputs for a given data rate to only a fraction (typically ½) of what would be required without preheat;

c. Reduction of the semiconductor laser output requirements to provide increased laser lifetime and/or enhancement of the data date capabilities of a given semiconductor laser array;

d. Reduction of the track-to-track spacing by typically 50% compared to what would be possible if no preheat were used, thereby increasing the capacity of the medium; and e. An increase in the data rate possible for a given media velocity by reduction of the minimum along-track feature size through the action of preheat.

In addition to the benefits derived when preheat is applied to multichannel semiconductor laser recording, there are other circumstances in which the use of preheat can be advantageous. Preheat can be used in a conventional gas laser multichannel system to allow the write energy requirement to be divided between two lasers, thereby reducing the power required from either one. This could allow the use of two lower power air-cooled gas lasers instead of a more complex water-cooled laser. The implementation of such a system would follow the explanation of FIG. 5 except the semiconductor laser array 60 would be replaced by a single gas laser, the output of which passes through a multi-channel modulator before being focused by the lens 71. Resolution would be improved if the use of preheat allows using a laser that emits a shorter wavelength then would otherwise be possible without preheat. For example, an air-cooled Helium-Cadmium gas laser emitting at 442 nm would allow a resolution improvement over a water-cooled Argon-Ion gas laser emitting at 488 nm.

Numerous other applications and embodiments may be developed utilizing the concepts of my invention. It is to be understood that my invention is not directed solely to the embodiments specifically described above, but rather by the claims which follow.

I claim:

1. A method of optical recording, comprising:
   focusing an unmodulated beam onto a spot on a thermally sensitive recording medium to heat the medium at said spot to a temperature below the hole formation threshold of the medium;
   cofocusing a modulated beam superimposed onto the unmodulated beam to form a spot the diameter of which is larger than the spot formed by said unmodulated beam, and
   selectively varying the temperature of the medium a said smaller spot above and below the hole formation threshold of the medium.

2. The method of claim 1, wherein said unmodulated beam has a first wavelength and said modulated beam has a second wavelength longer than said first wavelength.

3. A method of optical recording, comprising:
   focusing each of a plurality of unmodulated beams onto a separate spot on a thermally sensitive recording medium to heat the medium at each spot to a temperature below the hole formation threshold of the medium;
   cofocusing a plurality of modulated beams, one modulated beam superimposed onto each unmodulated beam to form a plurality of second spots the diameters of which are larger than the spots formed by said unmodulated beams, and
   selectively varying the temperature of the medium at said smaller spots above and below the hole formation threshold of the medium.

4. The method of claim 3, wherein each of said unmodulated beams has a first wavelength and each of said modulated beams has a second wavelength longer than said first wavelength.

* * * * *